US008400876B2

(12) United States Patent
Boufounos

(10) Patent No.: US 8,400,876 B2
(45) Date of Patent: Mar. 19, 2013

(54) METHOD AND SYSTEM FOR SENSING OBJECTS IN A SCENE USING TRANSDUCER ARRAYS AND COHERENT WIDEBAND ULTRASOUND PULSES

(75) Inventor: Petros T. Boufounos, Boston, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 140 days.

(21) Appl. No.: 12/895,408

(22) Filed: Sep. 30, 2010

(65) Prior Publication Data

US 2012/0082004 A1 Apr. 5, 2012

(51) Int. Cl.
*G01S 15/00* (2006.01)
(52) U.S. Cl. .......................................................... 367/99
(58) Field of Classification Search .................... 367/99
See application file for complete search history.

(56) References Cited

U.S. PATENT DOCUMENTS

| 4,282,589 | A | * | 8/1981 | Evetts et al. | 367/90 |
| 4,308,599 | A | * | 12/1981 | Thiele | 367/92 |
| 4,439,845 | A | * | 3/1984 | Geohegan et al. | 367/87 |
| 2004/0107821 | A1 | * | 6/2004 | Alcalde et al. | 84/608 |
| 2006/0122827 | A1 | * | 6/2006 | Trihy et al. | 704/205 |
| 2006/0215849 | A1 | * | 9/2006 | Smaragdis et al. | 381/92 |
| 2007/0067166 | A1 | * | 3/2007 | Pan et al. | 704/222 |
| 2007/0167784 | A1 | * | 7/2007 | Shekhar et al. | 600/443 |
| 2008/0265166 | A1 | * | 10/2008 | Shekhar et al. | 250/363.03 |
| 2009/0290452 | A1 | * | 11/2009 | Lyon | 367/99 |

OTHER PUBLICATIONS

Candes, E.J.; Romberg, J.; Tao, T.; , "Robust uncertainty principles: exact signal reconstruction from highly incomplete frequency information," Information Theory, IEEE Transactions on , vol. 52, No. 2, pp. 489-509, Feb. 2006.*

D. Donoho, "Compressed Sensing", Information Theory, IEEE Transactions on , vol. 52, No. 4, pp. 1289-1306, Apr. 2006.*
E. Candes, J. K. Romberg, T. Tao, "Stable signal recovery from incomplete and inaccurate measurements". Comm. on Pure and Applied Math., vol. 59, No. 8, pp. 1207-1223., Aug. 2006.*
E. Candes, "Compressive Sampling". Proc. Int'l. Congress of Mathematicians, Madrid, Spain., vol. 3 pp. 1433-1452, 2006.*
Hernandez, A.; Derutin, J.P.; Alvarez, F.J.; Jimenez, A.; , "Ultrasonic Sensory System for Mobile Robots and Autonomous Vehicles," Industrial Electronics, 2007. ISIE 2007. IEEE International Symposium on , vol., No., pp. 1548-1553, Jun. 4-7, 2007.*
D. Needell, J.A. Tropp, "CoSaMP: Iterative signal recovery from incomplete and inaccurate samples," Applied and Computational Harmonic Analysis, vol. 26, Issue 3, May 2009, pp. 301-321.*
Wei Dai; Milenkovic, O.; , "Subspace Pursuit for Compressive Sensing Signal Reconstruction," Information Theory, IEEE Transactions on , vol. 55, No. 5, pp. 2230-2249, May 2009.*

(Continued)

*Primary Examiner* — Isam Alsomiri
*Assistant Examiner* — James Hulka
(74) *Attorney, Agent, or Firm* — Dirk Brinkman; Gene Vinokur

(57) ABSTRACT

Pulses are transmitted into a scene by an array of the transducers, wherein each pulse has wideband ultrasound frequency, wherein the pulses are transmitted simultaneously, and wherein a pattern of the wideband ultrasound frequencies in each pulse is unique with respect to the patterns of each other pulse. The pulses as received when the pulse are reflected by the scene and objects in the scene. Each received pulse is sampled and decomposed using a Fourier transform to produce frequency coefficients, which are stacked to produce a linear system modeling a reflectivity of the scene and the objects. Then, a recovery method is applied to the linear system to recover the reflectivity of the scene and the objects.

20 Claims, 4 Drawing Sheets

OTHER PUBLICATIONS

Petros Boufounos: "Compressive Sensing for Over-The-Air Ultrasound," Acoustics, Speech and Signal Processing (ICASSP), 2011 IEEE International Confernece on, IEEE, May 22, 2011, pp. 5972-5975.

* cited by examiner

METHOD AND SYSTEM FOR SENSING OBJECTS IN A SCENE USING TRANSDUCER ARRAYS AND COHERENT WIDEBAND ULTRASOUND PULSES

FIELD OF THE INVENTION

This invention relates generally to sensing objects in scene, and more particularly to detecting the objects using ultrasound pulses.

BACKGROUND OF THE INVENTION

Narrowband Ultrasound Sensing

A prior art ultrasonic sensing system typically uses single-frequency (narrowband) transducer and time delay estimation to determine a distance to an object in a scene. Typically, the narrowband pulses have a center frequency around 40 kHz and bandwidth of 1-2 kHz; i.e., the pulses operate in the range of 40 kHz±1 kHz.

Specifically, the system measures a time delay between transmitting an ultrasonic pulse and receiving the first reflected pulse. The time delay is multiplied by the speed of the ultrasound pulse to an estimate of the distance traveled by a narrowband ultrasonic pulse. Later reflected pulses can provide additional information about the object. However, that information is difficult to discern, and current technology does not attempt to do so.

The further information can be deduced by an array of transducers, which transmit the same frequency pulse from each transducer with an appropriate time delay between pulses from different transducers, so that the overall transmission is essentially directed towards a particular position. This is sometimes called beam steering.

By scanning different directions, a receiver can estimate the distance of the nearest object in the particular direction. That approach is similar to methods used in medical ultrasound. That approach has the drawback that a large number of transducers is required to make an effective array. Furthermore, the scanning approach requires multiple pulses, which increases the time before the scene, i.e., the sensed objects, can be sufficiently reconstructed. Last, it is not possible to form virtual arrays by moving the array elements because all array elements need to be used simultaneously for beam steering.

SUMMARY OF THE INVENTION

Embodiment of the invention provided a method and system for sensing objects in a scene using ultrasonic transmitters and receivers and reconstructing a three dimensional representation of the scene in a 3D array of voxels.

DETAILED DESCRIPTION OF THE PREFERRED EMBODIMENT

Figure 3:
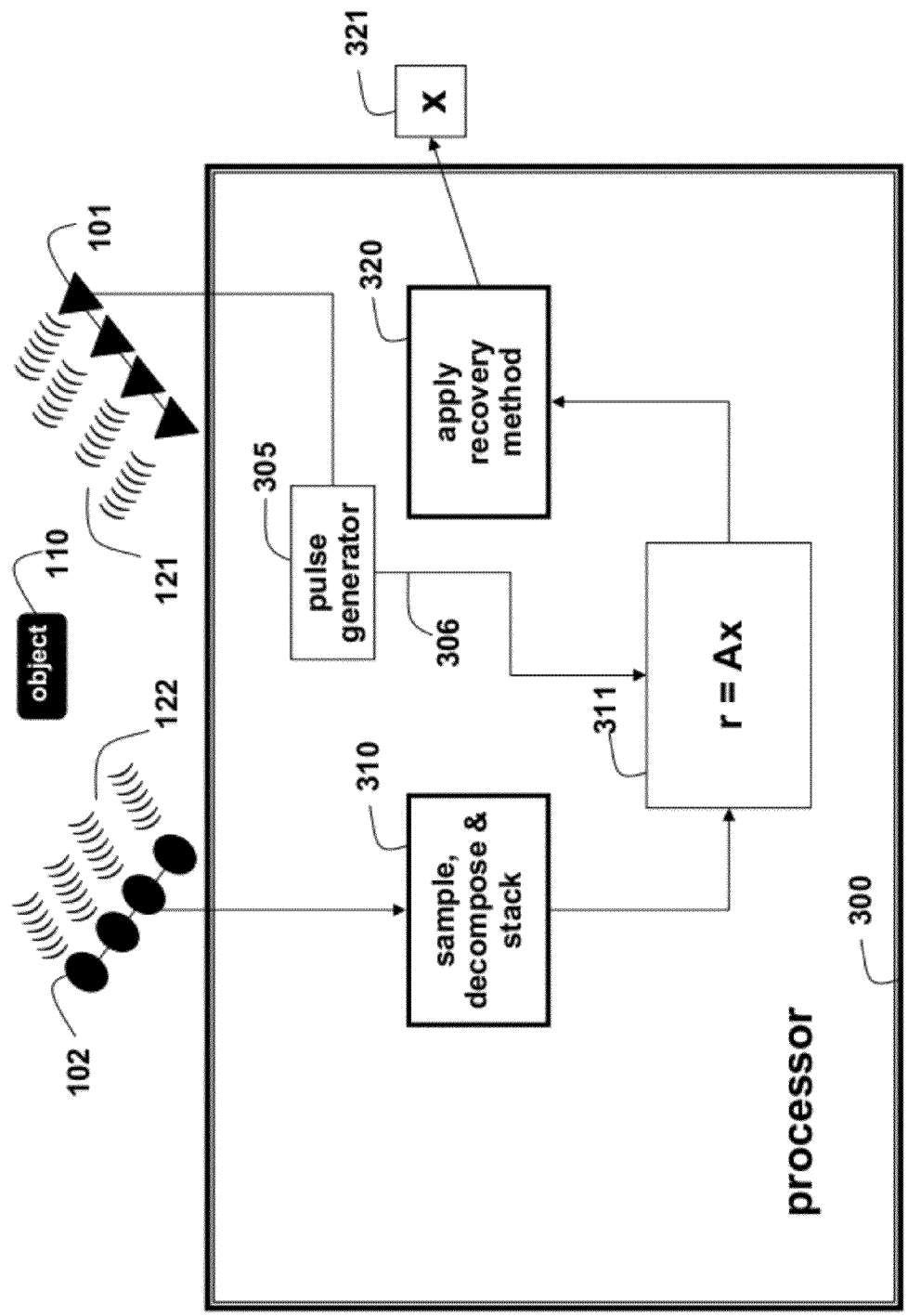
FIG. 3 is a block diagram of a system and method for sensing objects in a scene using an array of transducers and unique wideband ultrasound pulses according to embodiments of the invention.

The embodiments of the invention provided a method and system for sensing objects in a scene using an array of transducers and wideband ultrasound pulses. The method can be performed in a processor 300 connected to a memory and input/output interfaces as shown in FIG. 3.

In this description the following variables are defined:
Reflectivity of a scene point:

$$x_n$$

Pulse transmitted by transmitter k in the frequency domain:

$$P_k(\omega)$$

Pulse received by receiver l in the frequency domain:

$$R_l(\omega)$$

Distance of transmitter k to scene point m:

$$d_{k,m}$$

Distance of receiver/to scene point m:

$$d_{m,l}$$

Speed of ultrasound pulse:

$$c$$

Time delay for distance d:

$$d/c$$

Distance from trans. k to rec. l through scene point m:

$$d_{k,l,m} = d_{k,m} + d_{m,l}$$

Time delay from trans. k to rec. l through scene point m:

$$\tau_{k,l,m} = d_{k,l,m}/c$$

Figure 1:
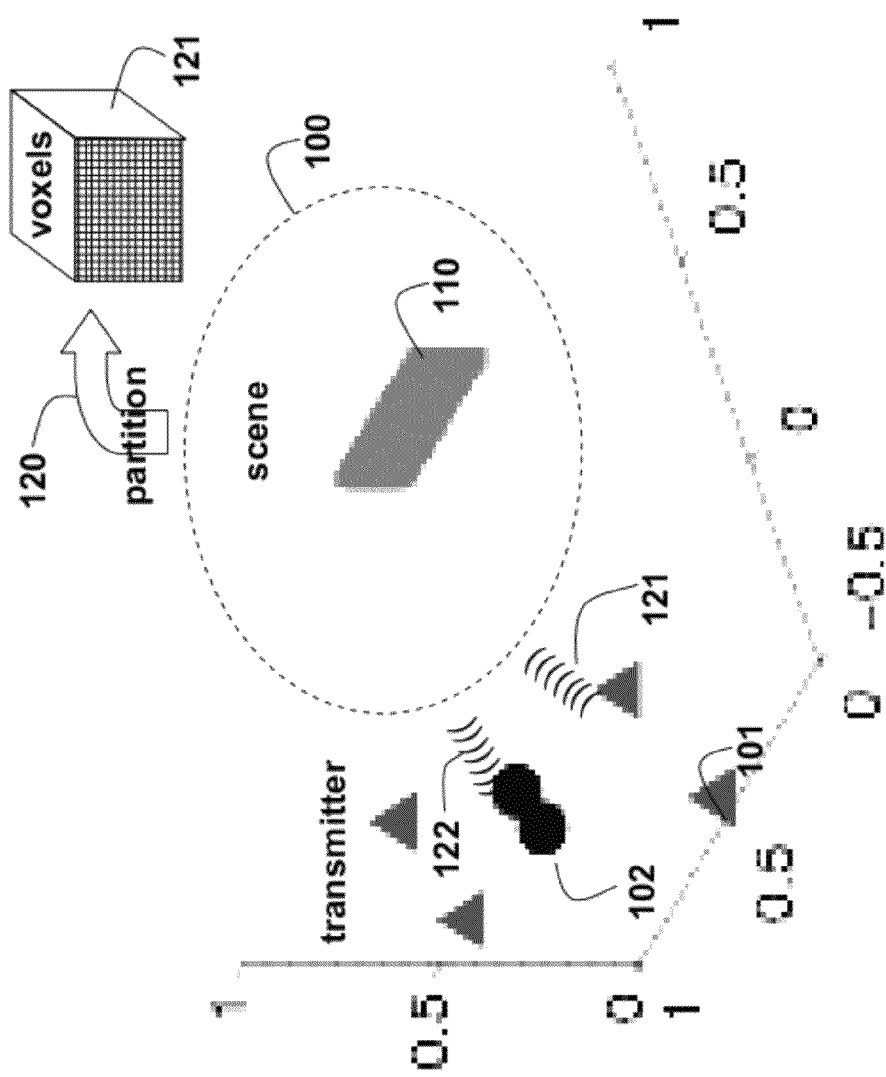
FIG. 1 is a schematic of an array of wideband ultrasound transducers for sensing an object in a scene according to embodiments of the invention.
Figure 2:
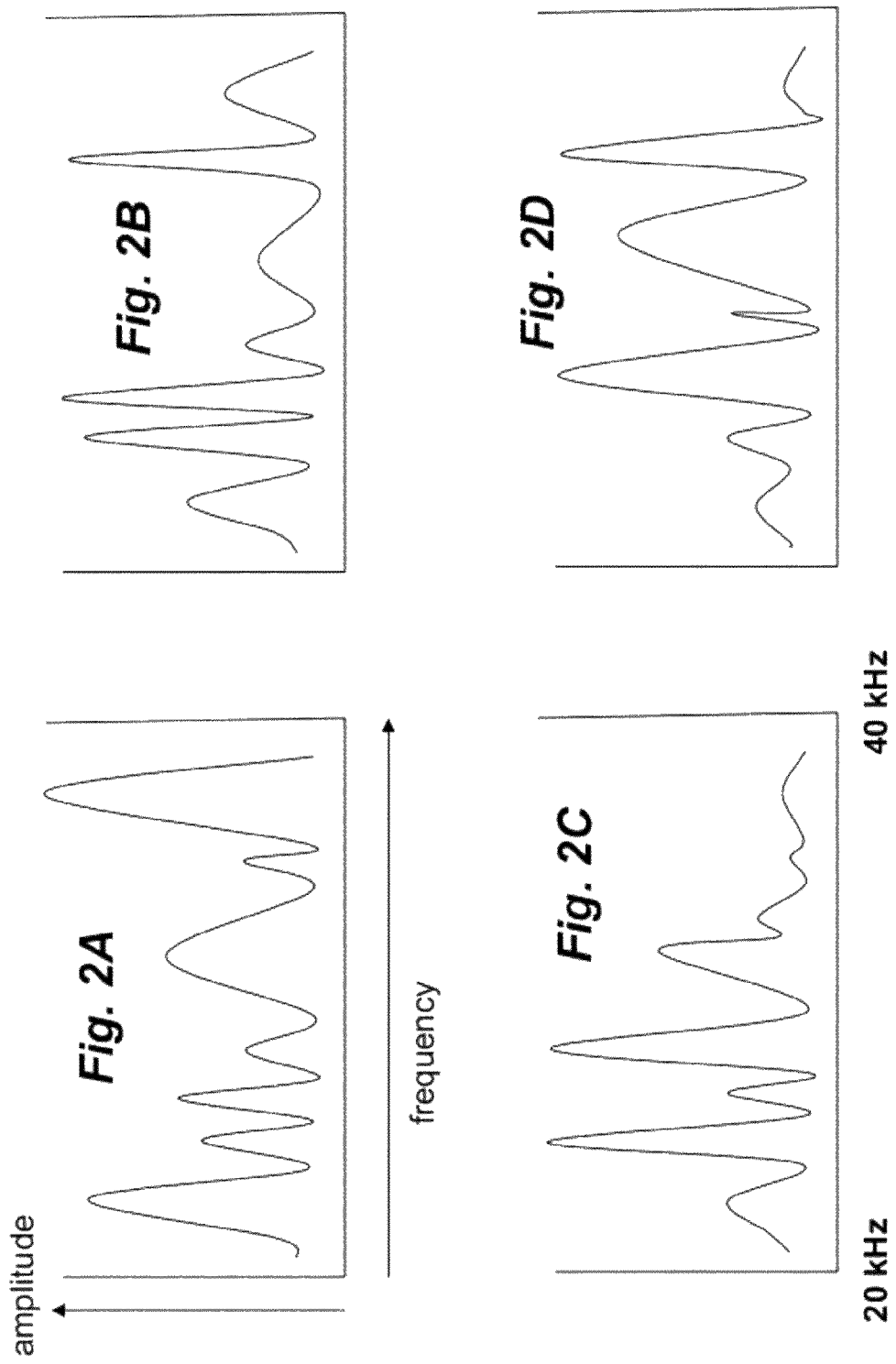
FIGS. 2A-2D are schematics of example unique frequency patterns for wideband ultrasound pulses according to embodiments of the invention.

As shown in FIG. 1, and array of K ultrasound transmitters (triangles) 101 and L receivers (circles) 102, generally transducers, are arranged in a scene 100 at a distance from an object 110. The transmitter and the receivers can be discrete physical devices or ultrasonic transducers operating as either transmitters or receivers of ultrasound pulses. In then later case, the transducers simultaneously each emit a pulse, and then switch to receive mode to sense the reflected pulses. The array can be regular or irregular.

The coordinate system for the arrangement shown in FIG. 1 is normalized in a range [0, 1]. Each transmitter 101 emits a wideband ultrasound pulses 121, $p_k(t)$, k=1, ..., K, which are reflected by the object 110 and detected as received pulses 122 by the receivers 102.

As shown in FIGS. 2A-2D, the frequencies of each wideband pulse are typically in range of 40-60 kHz. In other words, the frequency span of the wideband pulses is about one order of magnitude greater than that of the prior art narrowband pulses.

Although the range 40-60 kHz is suitable for certain applications, embodiments of the invention can operate in any frequency range. However, there are several trade-offs. Higher frequency pulses dissipate more in over-the-air transmission, and therefore are not suitable for sensing objects at larger distances. On the other hand, higher frequencies allow the system to have finer resolution and to distinguish finer features in objects. Similarly, transducers with smaller bandwidths are significantly easier to produce and much cheaper.

On the other hand transducers with higher bandwidth can provide better resolution and robustness to reconstructing the sensed scene.

Furthermore, according to the embodiments of the invention, the distribution of amplitude, as a function of frequency, is unique for each transducer as can be seen in FIGS. 2A-2D. This distribution for each pulse is such that the wideband pulses are incoherent with respect to each other. Thus, if many transmitting transducers simultaneously emit wideband pulses, then the corresponding received pulses at the receiving transducers can be uniquely identified and associated, with the particular transducer that emitted the pulse. Hence, explicit time delay estimation used in prior art beam steering transducer arrays, which transmit the same pulse from all the transmitters appropriately time delayed, is avoided.

As shown in FIG. 3, the pulses 121 emitted by each transducer 101 can be represent by discrete-time samples at a Nyquist rate, i.e., twice the bandwidth of the pulse, with a corresponding sampling period (T), which is also useful for digital generation 305 and processing 310 of the pulse. The pulse generator 305 also provides pulsing information 306 useful for the processing of the received pulses 122 by the receivers 102.

Thus, the discrete-time pulse $p_k[n]=p_k(nT)$ emitted by transmitter k can be decomposed as a sum of discrete frequencies using a discrete Fourier transform (DFT)

$$p_k[n] = \sum_f P_{k,f} e^{-j\omega_f n}, k = 1, \ldots, K, f = 1, \ldots, F, \quad (1)$$

where $P_{k,f}$ are the DFT coefficients of pulse $p_{k,f}$, $j=\sqrt{-1}$, and $\omega_f$ is an angular frequency corresponding to the $f^{th}$ frequency, i.e., $\omega_f=2\pi f$.

The received pulse $r_l(t)$ 122 at receiver l can be sampled and decomposed 310 using the Fourier transform $$r_l[n] = r_l(nT) = \sum_f R_{l,f} e^{-j\omega_f n}, l = 1, \ldots, L, f = 1, \ldots, F \quad (2)$$

where $R_{l,f}$ are the DFT coefficients of the reflected pulse $r_l$.

The scene 100 to be sensed and analyzed is a three dimensional (3D) volume containing a set of (one or more) objects 110. For the purpose of the analysis, the 3D volume can be partitioned 120 into $M=M_x \times M_y \times M_z$ voxels 121, see FIG. 1. The voxels are linearly indexed according to $m=1, \ldots, M$. A reflectivity of each voxel or scene point, with respect to the ultrasound pulses, is $x_m$. The linear indexing is similar to a raster scan order, wherein the voxels are processed in a left-to-right for each row (x), and then top-to-bottom (y), and last front-to-back (z).

The reflectivity of the voxel is zero if the voxel is empty, or if the voxel is occluded. Otherwise, if the voxel is not empty or not occluded by another nonempty voxel, the reflectivity is a complex number. Thus, only the surface of the object facing the transducers is sensed. The effect of partial occlusions, i.e. voxels that are occluded only in part of the transducers, is ignored because the effect is small compared to the overall precision of the ultrasonic sensing system.

Every voxel in the scene reflects the wideband ultrasonic pulse received by each transmitter according to the reflectivity $x_m$ of the voxel, as defined above. The distance from transmitter k to voxel m is $d_{k,m}$. The distance from voxel m to receiver l is $d_{m,l}$. The distance traversed by the ultrasonic pulse through voxel m is $d_{k,l,m}=d_{k,m}+d_{m,l}$. Thus, the total delay from the transmission of the pulse until the reception is $d_{k,l,m}/c$, where c is the speed of the ultrasound pulse in air.

Each receiver receives all the pulses transmitted by all the transmitters if reflected by non-zero voxels that correspond to objects. In the frequency domain, the receiver l receives frequency $\omega_f$ as $$R_{l,f} = \sum_m \left( \sum_k P_{k,f} e^{-j\omega_f \frac{d_{k,l,m}}{cT}} \right) x_m, \quad (3)$$

where T is the sampling period of the receiver, which should be smaller than the Nyquist rate for the pulses.

The frequency coefficients from all received pulses by the receivers when stacked 310 into one vector can be represented by $$\begin{bmatrix} R_{1,1} \\ \vdots \\ R_{1,F} \\ \vdots \\ R_{L,1} \\ \vdots \\ R_{L,F} \end{bmatrix} = \begin{bmatrix} \sum_k P_{k,1} e^{-j\omega_1 \frac{d_{k,1,1}}{cT}} & \cdots & \sum_k P_{k,1} e^{-j\omega_1 \frac{d_{k,1,M}}{cT}} \\ \vdots & \ddots & \vdots \\ \sum_k P_{k,F} e^{-j\omega_F \frac{d_{k,1,1}}{cT}} & \cdots & \sum_k P_{k,F} e^{-j\omega_F \frac{d_{k,1,M}}{cT}} \\ \vdots & \ddots & \vdots \\ \sum_k P_{k,1} e^{-j\omega_1 \frac{d_{k,L,1}}{cT}} & \cdots & \sum_k P_{k,1} e^{-j\omega_1 \frac{d_{k,L,M}}{cT}} \\ \vdots & \ddots & \vdots \\ \sum_k P_{k,F} e^{-j\omega_F \frac{d_{k,L,1}}{cT}} & \cdots & \sum_k P_{k,F} e^{-j\omega_F \frac{d_{k,L,M}}{cT}} \end{bmatrix} \begin{bmatrix} x_1 \\ \vdots \\ x_M \end{bmatrix}. \quad (4)$$

The vector equation is equivalent to a matrix equation 311, or linear system of the form $$r=Ax, \quad (5)$$

where r denotes a vector of coefficients of the reflectivity according to the received pulses, A is a transmission operator, and x 321 represents reflectivity in the scene.

The goal of a recovery method is to undo the action of A on x, and thus, recover x from the measurements of the frequency coefficients r, where x is the recovered scene.

Measurement Process and Scene Recovery

In practical applications, most of the scene is empty or occluded, and therefore, most of the reflectivity coefficients $x_m$, $m=1, \ldots, M$ are zero. Therefore, the vector x is sparse. Specifically, the vector x contains at most $M_x \times M_z$ non-zero elements, and at most $1/M_y$ of the coefficients are non-zero.

Recovery of a sparse vector from the measured coefficients r is possible by applying any of a number of recovery methods 320, e.g., a linear optimization formulation, which determines an optimization $$\hat{x} = \underset{x}{\operatorname{argmin}} \|x\|_1 \text{ such that } r \approx Ax, \text{ or} \quad (6)$$

$$\hat{x} = \underset{x}{\operatorname{argmin}} \|x\|_1 + \lambda \|r - Ax\|_2^2, \quad (7)$$

where $\lambda$ is a regularization parameter to control the suppression of undesired solutions, and "^" indicates an estimate.

Another recovery method uses a greedy algorithm, such as, but not limited to, a greedy sparse recovery algorithm, matching pursuit (MP), orthogonal matching pursuit (OMP), and Compressive Sampling Matching Pursuit (CoSaMP). If a model for the scene is known, then model-based compressive sensing reconstruction methods can be used.

Virtual Array Modeling

Figure 4:
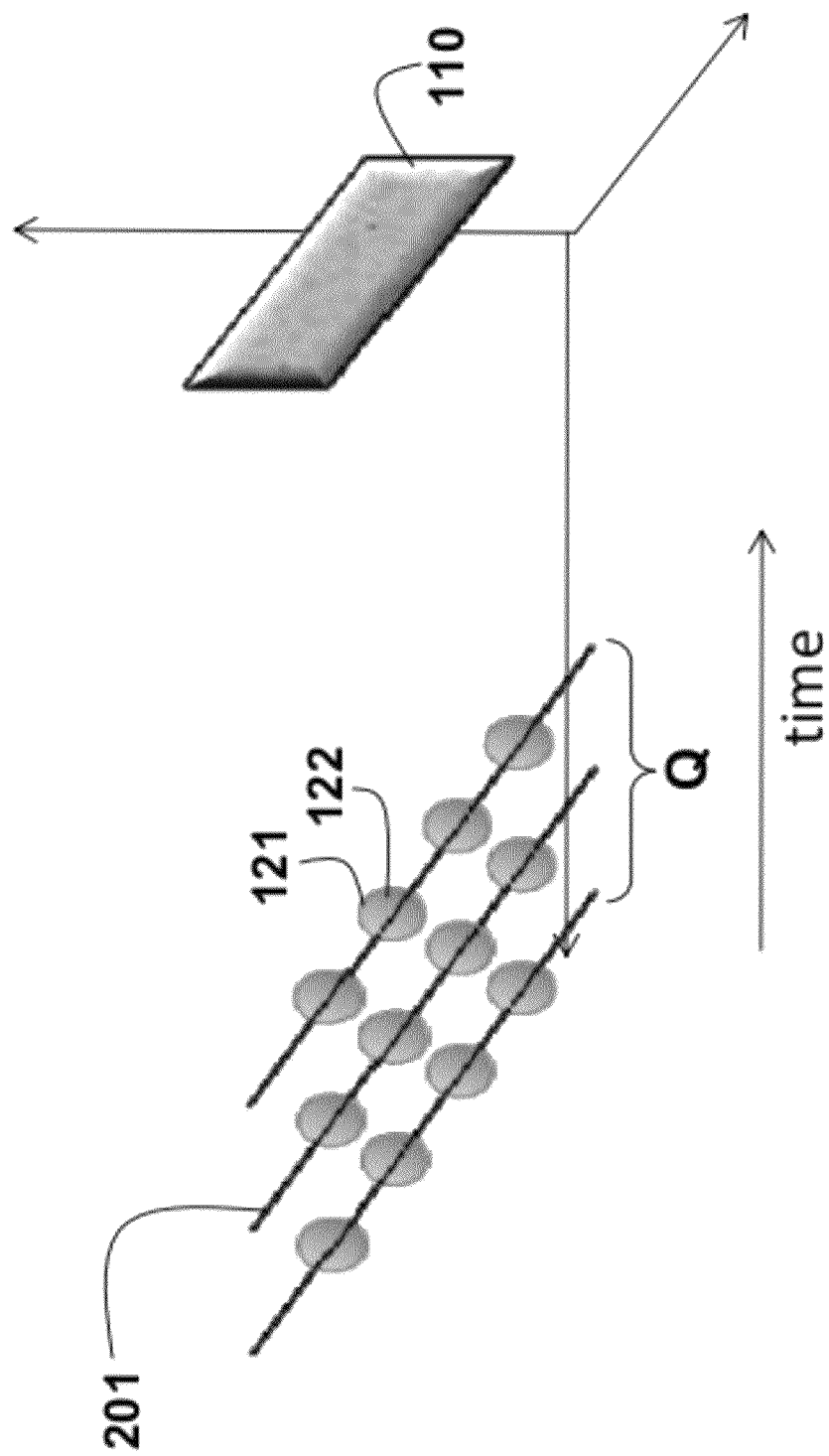
FIG. 4 is a schematic of a mobile array of wideband ultrasound transducers for sensing an object in a scene according to embodiments of the invention.

As shown in FIG. 4, another embodiment of the invention uses an array 201 of moveable transducers, which can be rearranged, over time, while acquiring measurements. The combined received data are subsequently used to reconstruct the scene. The transducers sense and obtain a snapshot of the scene from Q different positions over time. For each array position, a sensing equation similar to Equation (5) is $$r_q = A_q x, \qquad (8)$$

where $r_q$ represents the received pulses at the $q^{th}$ position, and $A_q$ is the sensing matrix, as derived by the geometry of the sensors and the scene in the $q^{th}$ position. Combining the sensing equations from all the positions results to the sensing equation $$\begin{bmatrix} r_1 \\ \vdots \\ r_Q \end{bmatrix} = \begin{bmatrix} A_1 \\ \vdots \\ A_Q \end{bmatrix} x. \qquad (9)$$

The methods described above can then be used to recover x, even if recovery using only one position and Equation (8) alone is not possible.

Applications

Vehicular Sensing

The embodiments of the invention can be effectively used for driver assistance in vehicle sensing applications. State of the art vehicle ultrasonic sensing uses four transducers placed on each bumper of the vehicle. The transducers operate independently and only provide ranging information to the operator about the nearest obstacle in the field of view of the sensors.

Using the invention, the information that is presented to the operator is significantly enhanced. The sensors on the bumper of the vehicle can act as an ultrasonic array. Furthermore, as the vehicle moves, the sensors change location and form the virtual array, which can provide more information to the driver. Using the invention, a three dimensional model of the environment surrounding of the vehicle can be produced, giving the operator significant information for parking assistance, lane change assistance, and obstacle detection, among others.

Environmental Sensing

The system can also be used in other applications where environmental sensing is necessary, e.g., robotic applications. The invention enables the robot to obtain a more accurate model of the environment compared to simple individual ultrasonic sensors. This enables better motion planning and collision avoidance strategies.

Another application uses embodiments of the invention for surveillance and security applications, e.g., to detect intrusions and breaches, without the need for a privacy invading expensive security camera. Similarly, the invention can be used in elevator lobbies for detecting a crowd in front of an elevator door, and accordingly an elevator schedule.

The invention can also be used to monitor air-conditioned (A/C) rooms to detect occupancy and adjust the A/C power and airflow direction accordingly.

EFFECT OF THE INVENTION

The embodiments of the invention use a small number of transducers that transmit and receive wideband ultrasound pulses. Each transducer emits a unique pulse at a frequency, with a different wide frequency content. Because each pulse is unique, it can be easily identified in the receivers, which allows the system to estimate the distance of the various objects in the scene from the corresponding transmitter. The wide bandwidth of the pulse serves two purposes. Pulses from each transmitter are unique with respect to other transmitters. Fewer transducers can be used because the diversity provided by using more frequencies.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for sensing a scene, comprising the steps of:
    transmitting pulses into the scene by an array of transducers, wherein each pulse has a wideband ultrasound frequency, wherein the pulses are transmitted simultaneously, and wherein a pattern of the wideband ultrasound frequencies in each pulse is unique with respect to the patterns of each other pulse;
    receiving the pulses by each transducer as received pulses when the pulse are reflected by the scene;
    sampling and decomposing each received pulse using a Fourier transform to produce a vector of frequency coefficients;
    partitioning a representation of the scene into voxels, wherein a reflectivity of each voxel is to be determined;
    stacking the reflectivities to be determined to form a vector of the reflectivities to be determined;
    forming a linear system, wherein the linear system models the vector of frequency coefficients given the vector of the reflectivities, wherein the transmitted pulses are represented as a multiplication of a transmission operator by the vector of the reflectivities to be determined; and
    applying a sparse recovery method to the linear system to determine the reflectivity of the scene.

2. The method of claim 1, wherein the array is regular.

3. The method of claim 1, wherein the array is irregular.

4. The method of claim 1, wherein the pulses transmitted by each transducer are represented by discrete-time samples at a Nyquist rate.

5. The method of claim 1, wherein the representation is three dimensional.

6. The method of claim 1, wherein the voxels are linearly indexed.

7. The method of claim 1, further comprising:
    determining a distance to each voxel having a non-zero reflectivity.

8. The method of claim 1 in which the linear system is represented as r=Ax, where r denotes the vector of reflectivities to be determined, A is the transmission operator, and x represents the reflectivity in the scene.

9. The method of claim 8, wherein the sparse recovery method optimizes $$\hat{x} = \operatorname*{argmin}_{x} \|x\|_1 \text{ such that } r \approx Ax,$$

wherein "^" indicates an estimate.

10. The method of claim 8, wherein the sparse recovery method optimizes $$\hat{x} = \underset{x}{\operatorname{argmin}} \|x\|_1 + \lambda \|r - Ax\|_2^2,$$

wherein "^" indicates an estimate, and $\lambda$ is a regularization parameter.

11. The method of claim 1, wherein the sparse recovery method is a greedy sparse recovery algorithm.

12. The method of claim 8, further comprising:
moving the array of transducers while transmitting and receiving the pulses, and wherein the linear system is $r_q = A_q x$ for each position q of the array of transducers.

13. The method of claim 1, wherein the array of transducers is mounted on a vehicle.

14. The method of claim 1, wherein the array of transducers is mounted on a robot.

15. The method of claim 1, wherein the scene is under surveillance by the array of transducers.

16. The method of claim 1, wherein the array of transducers monitors occupancy of the scene.

17. The method of claim 1, wherein the representation is two dimensional.

18. The method of claim 1, wherein the transmission operator incorporates a frequency transform of the transmitted pulses and delays between the transmitted pulses and the received pulses.

19. The method of claim 1, wherein the transmission operator is in a form of a sensing matrix.

20. A system for sensing a scene, comprising:
an array of transducers configured to transmit pulses into the scene from each transducer, wherein each pulse has a wideband ultrasound frequencies, wherein the pulses are transmitted simultaneously, and wherein a pattern of the wideband ultrasound frequencies in each pulse is unique with respect to the patterns of the other pulses, and wherein each transducer is configured to receive all pulses when the pulse are reflected by an object in the scene;
means for associating each received pulse with a particular transducer according to the unique pattern;
means for sampling and decomposing each received pulse using a Fourier transform to produce a vector of frequency coefficients;
means for partitioning a representation of the scene into voxels, wherein a reflectivity of each voxel is to be determined;
means for stacking the reflectivities to be determined to form a vector of the reflectivities to be determined;
means for forming a linear system, wherein the linear system models the vector of frequency coefficients given the vector of the reflectivities, wherein the transmitted pulses are represented as a multiplication of a transmission operator by the vector of the reflectivities to be determined, and wherein the transmission operator is in a form of a sensing matrix; and
means for recovering the reflectivity of the scene and the objects.

* * * * *